United States Patent
Krone et al.

(10) Patent No.: US 7,121,070 B2
(45) Date of Patent: Oct. 17, 2006

(54) HARVESTER

(75) Inventors: Bernard Krone, Spelle (DE); Josef Horstmann, Ibbenburen (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 156 days.

(21) Appl. No.: 10/904,346

(22) Filed: Nov. 5, 2004

(65) Prior Publication Data
US 2005/0091954 A1 May 5, 2005

(30) Foreign Application Priority Data
Nov. 5, 2003 (DE) ................................ 203 17 022

(51) Int. Cl.
*A01D 45/02* (2006.01)
(52) U.S. Cl. .................................. 56/62; 56/75; 56/98
(58) Field of Classification Search ................. 56/76, 56/118, 111, 75, 78, 88, 94, 98, 62
See application file for complete search history.

(56) References Cited

U.S. PATENT DOCUMENTS

| | | | | |
|---|---|---|---|---|
| 5,040,362 A | * | 8/1991 | Morgan et al. ................ 56/93 |
| 5,722,225 A | * | 3/1998 | Wuebbels et al. ............. 56/60 |
| 6,925,790 B1 | * | 8/2005 | Krone et al. ................... 56/51 |
| 7,010,903 B1 | * | 3/2006 | Bruening ....................... 56/51 |

\* cited by examiner

*Primary Examiner*—Meredith C. Petravick
(74) *Attorney, Agent, or Firm*—Gudrun E. Huckett

(57) ABSTRACT

A harvester for harvesting stalky crops has an intake and conveying device having an endless conveyor provided with outwardly oriented cutting, holding, and conveying elements that form cutting planes and holding planes. The endless conveyor has a supply area for transferring crop to an inlet opening of a processing device. The supply area has a stripping device with clearing elements each having a stripping surface. The stripping surfaces of the clearing elements are remote from a holder and face forwardly in the traveling and working direction. The stripping surfaces are vertical in an end area pointing in the traveling and working direction and positioned in a common vertical plane. The stripping surfaces have a section extending from the end area in a direction of crop flow and diverge with increasing spacing from one another in the direction of crop flow.

10 Claims, 3 Drawing Sheets

HARVESTER

BACKGROUND OF THE INVENTION

The invention relates to a harvesting device for harvesting corn or a similar stalky crop wherein the harvesting device (harvester) comprises at least one intake and conveying device with a circulating endless conveyor having outwardly oriented functional elements such as cutting and/or holding and conveying elements that form at least one lower cutting plane and at least one holding plane arranged above. The endless conveyor conveys the harvested crop to an inlet opening of a processing device, in particular, a crop chopper. In the supply area, where the harvested crop is supplied to the inlet opening of the processing device, a stripping device is provided which is comprised of at least two clearing elements each forming a stripping surface. The clearing elements are connected with their rear area by means of support means to a holder.

Such a harvester, provided especially as an attachment for a mobile processing device, in particular, a crop chopper, serves for cutting, receiving, and transferring corn plants, for example, to a crop chopping device.

Such harvesters are known in various configurations. For example, German letters patent 199 52 566 C1 of the assignee discloses a harvester which is advantageously suitable for harvesting stalky crop by employing a large working width and, in this connection, is characterized in particular by a constructive expenditure as little as possible and thus also by minimal weight. In this connection, the harvester is preferably configured with two intake and conveying devices that comprise endless conveyors oriented in regard to their longest extension approximately transversely to the traveling and working direction and comprised of conveying and guiding elements that are connected pivotably in series to one another. In order to provide for safe receiving and guiding actions of the stalky crop, the conveying and guiding elements are divided into at least two conveying and guiding planes that are positioned at a spacing above one another. Drivers are arranged in these conveying and guiding planes, and the drivers, as a function of the conveying and guiding plane, respectively, either take on the function of a counter blade and, in this way, a mowing and cutting device is formed in cooperation with a stationary cutting blade that is arranged underneath the conveying and guiding elements, or they take on the function of a holder for reliably guiding and holding the stalky crop when transferring the crop into a processing device of the type of a chopping device of a crop chopper.

The transfer of the plant stalks from the endless conveyor to the processing device is a particularly critical task in such harvesters. On the one hand, the holding and guiding elements must securely hold stalky crop safely and convey it to the transfer area, on the other hand, in the transfer area an unimpaired complete transfer from the endless conveyor to the processing device must be ensured in order to prevent clogging.

In German letters patent 199 52 566 C1 a solution of this problems is proposed in the form of a stripping device that ensures unimpeded material transfer by means of its configuration with openings between the clearing elements and the holders of the stripping device positioned at a spacing thereto, which openings form lateral passages for removing crop that can no longer be taken up and would collect in front of the intake opening and clog the intake opening if not removed.

When using the device in the field, it was found that, under difficult harvesting conditions and when the plants are wet, at the edges of the clearing elements and in the area of the holders of the stripping device residual crop will collect and possibly impede the transfer and the crop flow in this way.

SUMMARY OF THE INVENTION

It is therefore an object of the present invention to provide a harvester of the aforementioned kind for harvesting corn or similar stalky crop with which the risk of clogging in the supply area to the crop chopper or a similar processing device is prevented and, in this way, the operational safety of the harvester is improved.

In accordance with the present invention, this is achieved in that the stripping surfaces of the clearing elements, that face the harvested crop and are substantially vertical, diverge with increasing spacing over their length in the direction of the crop flow from their position in a common plane provided in the end areas of the clearing elements, which end areas point in the traveling and working direction.

Accordingly, the present invention solves the object in particular by means of a very advantageous modification of the stripping device. The function of the stripping device is not only that of stripping and supplying the stalky crop from the endless conveyor in the discharge and transfer (supply) area toward the processing device but also stripping and thus cleaning of the outwardly oriented cutting, holding, and conveying elements provided on the endless conveyor from possibly adhering or attached plant residue, for example, leaves. This is realized, as is the removal of the plant stalks, when the cutting, holding, and conveying elements pass through and simultaneously retract from slots that are formed between the clearing elements of the stripping device. Because these processes occur at high speeds and thus also at high pressure, under certain harvesting conditions particularly on the edges of stripping surfaces of the clearing elements undesirable crop deposits will be formed that can grow quickly and can lead to clogging of the device.

Because of the particularly advantageous configuration of the clearing elements of the stripping device according to the invention, on the one hand, adhesion is reduced effectively and, on the other hand, further collection or growth of deposits is prevented in that, by means of the stepped arrangement of the clearing elements according to the invention, in their end area pointing toward the processing device a very effective cleaning action of the clearing elements by means of the crop flow is provided. A further effective improvement of operational safety is realized for the inventive stripping device in that the holders are moved. The intelligent placement of the holder for the stripping device outside of the supply area of the crop to the processing device and a corresponding modification of the stripping device prevents reliably collection of crop that leads to a clogging action.

A further advantageous aspect is to be seen in the universal application of the features according to the invention. For example, it is of little importance whether the invention is based on an intake and conveying device which is comprised of individual sequentially connectable conveying and guiding elements that have pivot axes at their ends and form a circulating endless conveyor with outwardly oriented cutting and/or holding elements that are configured as counter blades and/or holders or whether the invention is based on an intake and conveying device which is either formed of an endlessly circulating link chain with outwardly oriented cutting and/or holding means or of rotating conveying disks and/or drums. The use of the stripping device according to the invention leads for almost all known intake and conveying devices to a row-independent harvesting of corn or similar stalky crop with a reliable improvement of the operational safety.

DESCRIPTION OF THE PREFERRED EMBODIMENTS

Figure 1:
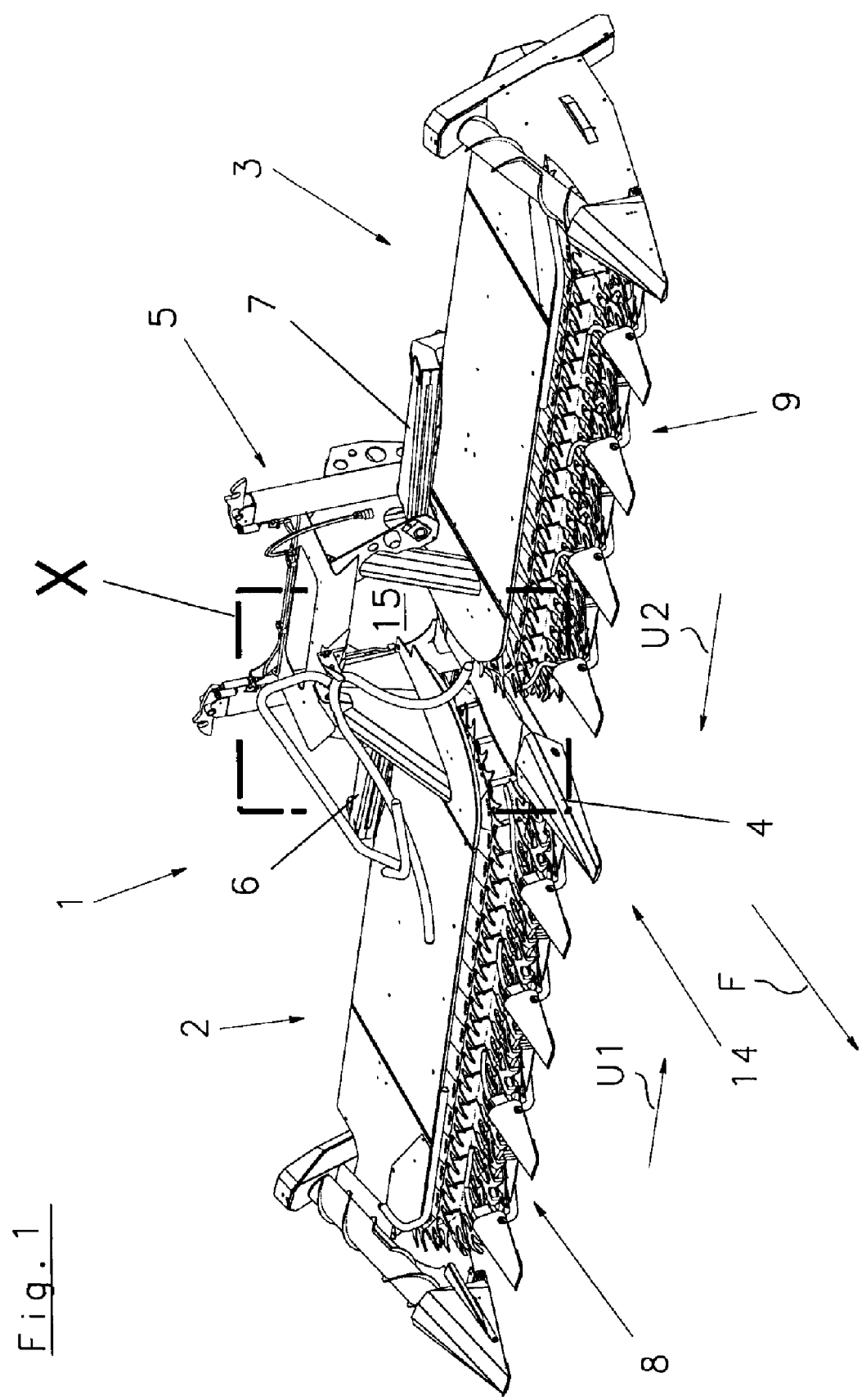
FIG. 1 is a perspective illustration of a harvester according to the invention with two mirror-symmetrically arranged intake and conveying devices in the form of circulating conveyors.

A preferred embodiment of a harvester 1 that is embodied in particular as an attachment for a mobile processing device in the form of a crop chopper for row-independent harvesting of stalky crop such as corn or the like is illustrated in FIG. 1 in detail. It is comprised of at least one and preferably, as illustrated here, two intake and conveying devices 2, 3 that are oriented with their longest extension transversely to the traveling and working direction F. They are arranged adjacent to one another such that a continuous crop strip can be harvested with a large working width. Between the intake and conveying devices 2, 3 a central dividing tip 4 is provided for dividing and directing the crop strip to be harvested to the intake and conveying devices 2, 3. For suspending the harvester 1 form a processing device, a support frame 5 is provided. By means of the support arms 6, 7 the intake and conveying devices 2, 3 can be transferred from the working and operating position illustrated in FIG. 1 into a transport position in which the intake and conveying devices 2, 3 are in a substantially vertically oriented (upwardly folded) position providing a minimal transport width.

Each intake and conveying device 2, 3 is comprised of a circulating endless conveyor 8, 9 that is configured to be guided and driven by drive wheels (not illustrated) that are rotatably supported on axes of rotation and located near a discharge and transfer (supply) area of the endless conveyors 8, 9 to the processing device, in the form of a crop chopper, as well as by a deflection wheel (not illustrated) within an outer deflection area. The circulating direction U1, U2 of the endless conveyor 8, 9 extends approximately transverse to the traveling and working direction F and is oriented toward the center of the harvester 1. Further conceivable configurations of a harvester can also be designed such that the circulation directions U1, U2 of the endless conveyor 8, 9 extend opposite to the travel and working direction F at a slant to the rear toward the center of the harvesting device.

Figure 2:
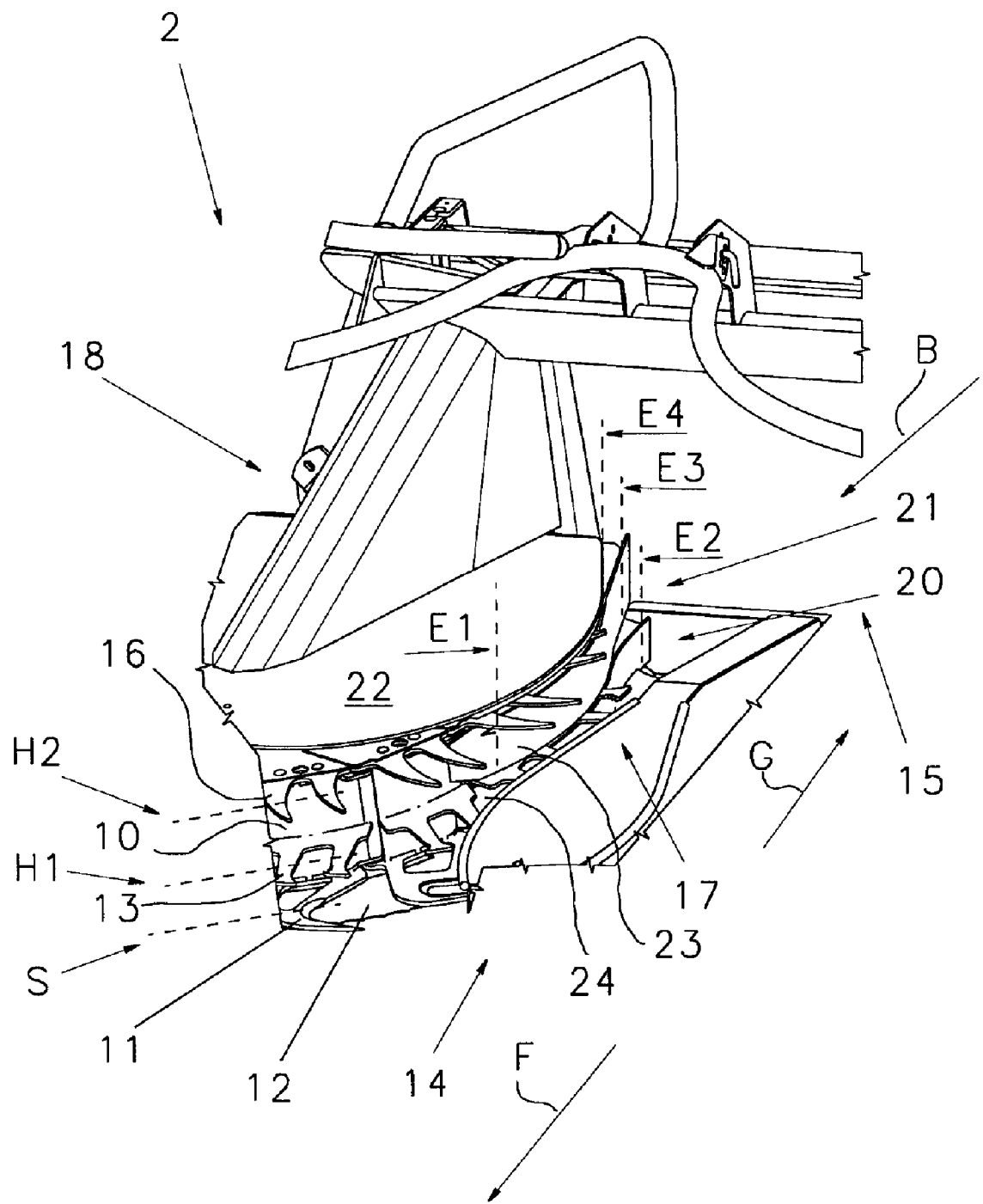
FIG. 2 is a partially broken away detail view of the area X in FIG. 1.

In FIG. 2, a partially broken away perspective view, viewed in a viewing direction that is opposite to the traveling and working direction F, of the inner area of an intake and conveying device 2, 3 is illustrated and shows in particular the inner deflection area of an endless conveyor 8, 9. As can be taken from this illustration, the endless conveyors 8, 9 are comprised of a plurality of sequentially arranged conveying and guiding elements 10 that are connected to one another by pivot axes arranged at their ends. The conveying and guiding elements 10 are formed as a unitary functional unit and are provided in their lower area with cutting elements 11. In this way, a cutting plane S is formed in which the stalks of the crop are cut. The cutting elements 11 can be configured, for example, like an angled blade and can cut the stalks either by performing a free cut or by cooperating with a stationary or movable counter blade 12.

Above the center cutting plane, a holding plane H1 comprising at least one holding element 13 is provided wherein the holding elements 13 effect further conveying of the cut stalks to the supply area 14 and from there into the intake opening 15 of the processing device. An improved holding action results when a second holding plane H2 is provided that is formed by holding elements 16 and extends parallel to the first holding plane H1.

The endless conveyors 8, 9 that convey toward the center in the illustrated embodiment, i.e., in opposite conveying directions U1 and U2, each have conveying and guiding elements 10 that are mirror-symmetrically arranged. The cutting elements 11 in the illustrated embodiment are configured as hook-shaped blades wherein cutting is performed at the inner side of hooks. The holding elements 13, 16 are also hook-shaped or provided with a slant in order to enable a safe transport of the cut-off stalks. The cutting elements 11 and the holding elements 13, 16 can be exchangeable parts of the conveying and guiding elements 10 as they are subject to wear and can be attached, for example, by screws or pins on the conveying and guiding elements 10. The cutting elements 11 interact with a stationary counter blade 12 wherein, by angling the cutting elements 11, it is ensured that the stalks are pulled in the direction toward the counter blade 12.

The entire crop that is conveyed by the endless conveyors 8, 9 is collected in the supply area 14 of the harvester 1 so that the risk of disruptions, for example, clogging, is greatest at this location. For a flow of crop as disruption-free as possible, the transfer of the plant stalks from the endless conveyors 8, 9 to the inlet opening 15 and thus to the processing device is a particular critical task. In this connection, the supply area 14 is provided with a stripping device 17 in order to clear crop from the endless conveyors 8, 9 and to supply the crop to the inlet opening 15.

Figure 3:
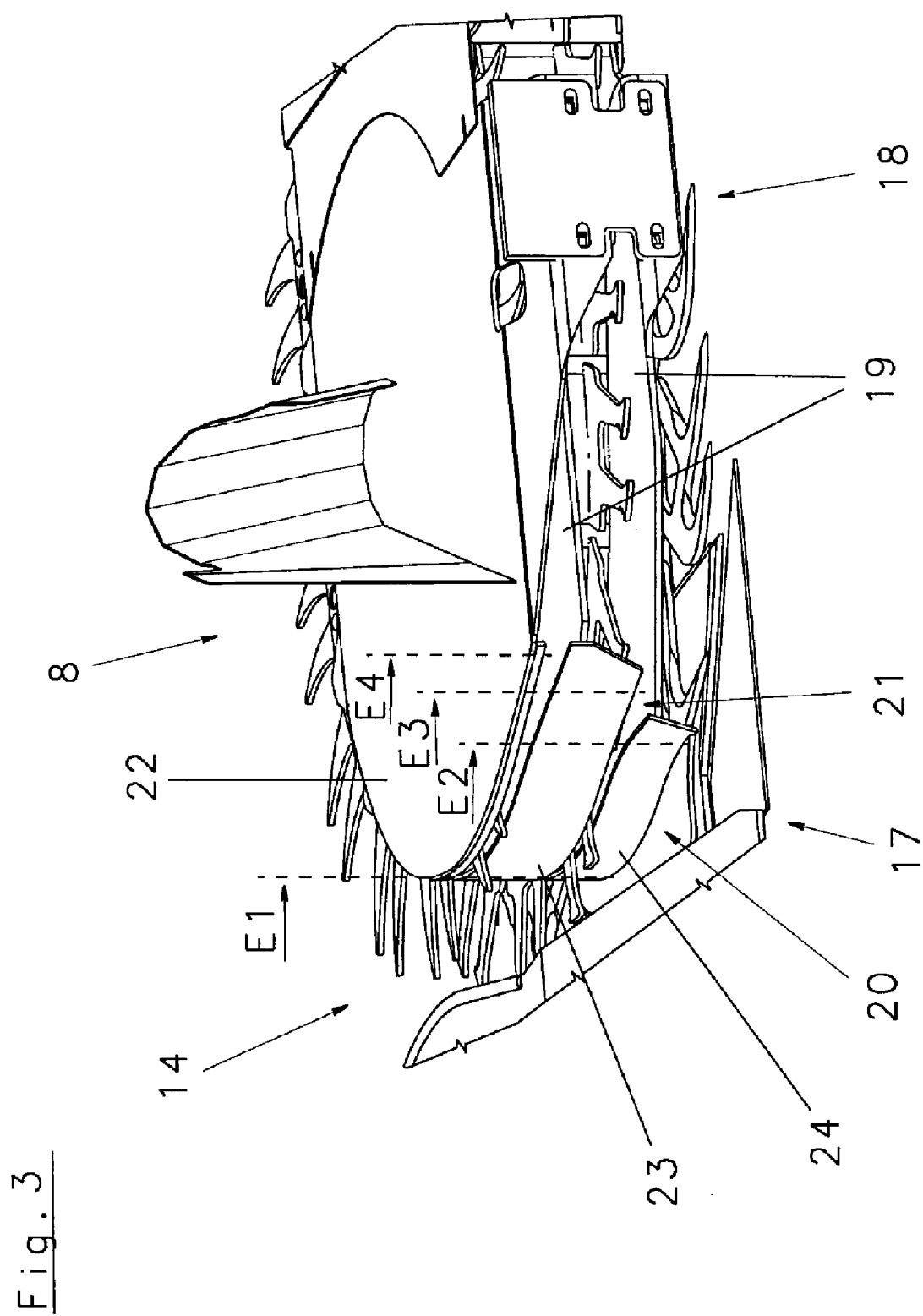
FIG. 3 is a partially broken away detail view in the viewing direction according to arrow B in FIG. 2.

In FIG. 3, which is a perspective, partially broken-away view of the inner end area of an intake and conveying device 2, 3 viewed from the rear in a viewing direction coinciding with the traveling and working direction F, the configuration of the stripping device 17 can be seen particularly well. The rear portion of the stripping device 17, relative to the traveling and working direction F, has a holder 18 and support means 19 connected to the holder 18. The support means 19, for example, in the form of essentially horizontally extending plates, extend in the traveling and working direction F and their ends facing away from the holder 18 support the clearing elements 20, 21. The clearing elements 20, 21 are correlated with the cutting and holding planes S, H1, H2. The clearing elements 20, 21 are upright, are matched to the curvature of the deflection of the endless conveyors 8, 9 in the supply area 14, and extend between two planes, respectively. The conveying and guiding elements 10 have closed front surfaces for better interaction with the clearing elements 20, 21 of the stripping device 17.

In a harvester 1 with two endless conveyors 8, 9, the arrangement is mirror-symmetrical so that, to the left and to the right of the inlet opening 15, stripping devices 17 are arranged whose clearing elements 20, 21 are matched with their end areas pointing in the traveling and working direction F to the endless conveyers 8, 9 and along their further course opposite to the traveling and working direction F extend approximately parallel to a vertical longitudinal center plane of the vehicle. The holders 18 have been moved according to the invention so far outwardly of the supply area 14 that they cannot in any way impair the flow of the crop.

The stripping devices 17 can be arranged pivotably on the holders 18 so that the stripping devices, for example, for cleaning or servicing purposes, can be pivoted away from the conveying and guiding elements 10. A movement back into the functional position in which the leading end areas of the clearing elements 20, 21 are secured closely spaced in front of the front surfaces of the conveying and guiding elements 10 can be achieved by means of spring loading and use of, optionally adjustable, stops for securing a minimum spacing. Alternatively, the stripping devices 17 can be fixedly connected to the holders 18.

Between the clearing elements 20, 21 as well as between the lower clearing element 21 and the counter blade 12 and the upper clearing element 20 and a cover plate 22, the holding elements 13, 16 and the cutting elements 11 are moving such that they are stripped by the clearing elements 20, 21 and the cover plate 22. In order to safely prevent or timely remove plant part deposits, which may occur under certain harvesting conditions and, when increasing, can lead to clogging, by stripping of the aforementioned components, the clearing elements 20, 21 are provided with a special shape according to the invention.

In the FIGS. 2 and 3, the different advantageous shape according to the invention of the clearing elements 20, 21 and of the cover plate 22 can be seen easily. This inventive shape is characterized in that the vertical stripping surfaces 23, 24 in the end area that points in the traveling and working direction F of the clearing elements 20, 21 and the stripping edge of the cover plate 22 are positioned in a common vertical plane E1; the stripping surfaces have a section diverging from this common plane along their extension in the direction of the crop flow G and the sections end in the vertical planes E2 and E3, respectively, wherein the upper cover plate 22 for this purpose forms a further stripping plane E4. The shape according to the invention of the clearing elements 20, 21 results, on the one hand, in an advantageous stepped arrangement of the stripping device 17 and, on the other hand, in the slots through which the holding elements 13, 16 pass are being enlarged increasingly in the direction of the crop flow G in this way.

The stepped arrangement or configuration is formed such that the supply area 14 between the mirror-symmetrically opposed endless conveyers 8, 9 taper in the downward direction in the area of the stepped arrangement of the stripping devices 17. This means that in the view from above each step is visible and, therefore, the crop that is supplied by the endless conveyers 8, 9 to the inlet opening 15 upon being pulled into the processing device passes across these steps and thereby provides a cleaning effect.

The particularly advantageous features of the invention effect a significantly improved continuous cleaning of the stripping device 17 by the crop. This effect, inter alia, is even reinforced as a result of the stepped arrangement by the increased stripping pressure exerted on the otherwise critical edges of the clearing elements 20, 21 by the plant stalks. Moreover, possibly caught plant parts in the area of the slots between the clearing elements will become detached more easily by means of the horizontal widening in the direction of the crop flow G. Accordingly, the invention provides for a significant reduction of the clogging risk in the supply area 14 of the harvester 1 and the overall operational safety is improved in this way.

While specific embodiments of the invention have been shown and described in detail to illustrate the inventive principles, it will be understood that the invention may be embodied otherwise without departing from such principles.

What is claimed is:

1. A harvester for harvesting stalky crops, the harvester comprising:
   at least one intake and conveying device having a circulating endless conveyor provided with outwardly oriented functional elements for performing at least one of cutting, holding, and conveying;
   wherein the functional elements form at least one lower cutting plane and at least one holding plane arranged above the at least one cutting plane;
   wherein the endless conveyor has a supply area for transferring a harvested crop to an inlet opening of a processing device;
   wherein the supply area comprises a stripping device comprised of at least two clearing elements each having a stripping surface;
   wherein the stripping device has a rear area, relative to a traveling and working direction of the harvester, and a holder arranged at the rear area;
   wherein the stripping device has support means connected to the holder, wherein the support means connects the at least two clearing elements to the holder;
   wherein the stripping surfaces of the clearing elements are remote from the holder and face forwardly in the traveling and working direction;
   wherein the stripping surfaces are substantially vertical in an end area pointing in the traveling and working direction and are positioned in a common vertical plane;
   wherein the stripping surfaces extend from the end area in a direction of crop flow opposite to the traveling and working direction and diverge with increasing spacing from one another in the direction of crop flow.

2. The harvester according to claim 1, wherein the stripping device comprises a stepped arrangement having steps in an end area in the direction of crop flow.

3. The harvester according to claim 2, wherein the steps are formed by the clearing elements.

4. The harvester according to claim 2, wherein the at least one intake and conveying device comprises a cover plate and wherein the cover plate forms an additional step of the stepped arrangement.

5. The harvester according to claim 2, wherein in a vertical view from above onto the harvester all of the steps of the stepped arrangement are freely visible.

6. The harvester according to claim 1, wherein the stripping surfaces each have a section extending from the end area in the direction of crop flow, wherein the sections diverge from the common vertical plane in the direction of crop flow and each end in a different vertical plane, wherein the different vertical planes are spaced apart from one another.

7. The harvester according to claim 6, wherein the different vertical planes are substantially parallel to one another.

8. The harvester according to claim 6, wherein the vertical plane of the section of the clearing element that is arranged closest to a ground on which the harvester is positioned has a smallest spacing from a vertical longitudinal center plane of the vehicle.

9. The harvester according to claim 1, wherein the holder of the stripping device is arranged such that it is positioned outside of an area of crop flow.

10. The harvester according to claim 1, wherein the holder of the stripping device, viewed in the travel and working direction, is arranged behind the at least one intake and conveying device.

* * * * *